(12) United States Patent
Tang

(10) Patent No.: US 11,648,675 B2
(45) Date of Patent: May 16, 2023

(54) MOTHER-CHILD ROBOT COOPERATIVE WORK SYSTEM AND WORK METHOD THEREOF

(71) Applicant: ECOVACS ROBOTICS CO., LTD., Suzhou (CN)

(72) Inventor: Jinju Tang, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 487 days.

(21) Appl. No.: 16/307,874

(22) PCT Filed: Jun. 8, 2017

(86) PCT No.: PCT/CN2017/087543
§ 371 (c)(1),
(2) Date: Dec. 6, 2018

(87) PCT Pub. No.: WO2017/211315
PCT Pub. Date: Dec. 14, 2017

(65) Prior Publication Data
US 2019/0217474 A1 Jul. 18, 2019

(30) Foreign Application Priority Data
Jun. 8, 2016 (CN) .......................... 201610402740.7

(51) Int. Cl.
*B25J 9/16* (2006.01)
*B25J 11/00* (2006.01)
(Continued)

(52) U.S. Cl.
CPC ............. *B25J 9/1682* (2013.01); *A47L 11/24* (2013.01); *B25J 9/1664* (2013.01);
(Continued)

(58) Field of Classification Search
CPC .............. G05D 1/02; G05D 1/00; B25J 11/00
See application file for complete search history.

(56) References Cited

U.S. PATENT DOCUMENTS 8,755,936 B2 6/2014 Friednman et al.
2006/0079997 A1* 4/2006 McLurkin .............. G06N 3/008
700/245
(Continued)

FOREIGN PATENT DOCUMENTS

CN 102062587 A 5/2011
CN 203314894 U 12/2013
(Continued)

OTHER PUBLICATIONS

Tian Syung Lan et al "Construction of the Control System of Cleaning Robots with Vision Guidance"; 7 pages (Year: 2013).*
(Continued)

*Primary Examiner* — Kira Nguyen
(74) *Attorney, Agent, or Firm* — Maschoff Brennan

(57) ABSTRACT

A mother-child robot cooperative work system and a work method thereof include a mother robot and a charging base0, in which the mother robot is provided with a control unit and a work unit. The system also includes child robot, communicatively coupled to the mother robot. The mother robot performs cleaning for a work area under the control of the control unit, and recognizes cleanable area and assisted cleaning area in a cleaning process. After cleaning work in the cleanable area is completed, the control unit in the mother robot controls the child robot to cooperatively complete the cleaning work in the assisted cleaning area. The mother robot is provided with a child robot pose sensing unit. The unit inputs child robot pose information to the control unit; and the control unit controls the child robot to act as indicated.

17 Claims, 2 Drawing Sheets

(51) Int. Cl.
*A47L 11/24* (2006.01)
*B25J 13/00* (2006.01)
*G05D 1/00* (2006.01)
*G05D 1/02* (2020.01)

(52) U.S. Cl.
CPC ......... *B25J 11/0085* (2013.01); *B25J 13/006* (2013.01); *G05D 1/0027* (2013.01); *G05D 1/0236* (2013.01)

(56) References Cited

U.S. PATENT DOCUMENTS

| | | | |
|---|---|---|---|
| 2011/0135189 A1* | 6/2011 | Lee | G05D 1/0295 901/1 |
| 2012/0152877 A1 | 6/2012 | Tadayon | |
| 2014/0203197 A1* | 7/2014 | Jeon | G01S 17/74 250/557 |
| 2014/0336818 A1* | 11/2014 | Posselius | G05D 1/0297 700/248 |
| 2014/0371909 A1* | 12/2014 | Lee | G05D 1/0246 700/259 |
| 2015/0148951 A1 | 5/2015 | Jeon et al. | |
| 2015/0297052 A1* | 10/2015 | Eidmohammadi | G05D 1/0225 134/18 |
| 2016/0179101 A1 | 6/2016 | Zheng | |
| 2017/0057080 A1* | 3/2017 | Krohne | B25J 11/005 |
| 2018/0009109 A1* | 1/2018 | Norton | B25J 9/1682 |
| 2018/0192845 A1* | 7/2018 | Gu | B25J 13/086 |
| 2018/0242806 A1* | 8/2018 | Haegermarck | A47L 11/24 |

FOREIGN PATENT DOCUMENTS

| | | |
|---|---|---|
| CN | 104062972 A | 9/2014 |
| CN | 104924312 A | 9/2015 |
| CN | 104932495 A | 9/2015 |
| CN | 104965513 A | 10/2015 |
| CN | 105011866 A | 11/2015 |
| CN | 205942412 U | 2/2017 |
| JP | 2003-180587 A | 7/2003 |
| JP | 2005-124753 A | 5/2005 |

OTHER PUBLICATIONS

European Search Report in Application No. 17809754.9 dated Jan. 22, 2020.

CN Office Action in Application No. 201610402740.7 dated Feb. 18, 2023.

* cited by examiner

MOTHER-CHILD ROBOT COOPERATIVE WORK SYSTEM AND WORK METHOD THEREOF

FIELD

The present disclosure relates to a mother-child robot cooperative work system and a work method thereof.

BACKGROUND

Due to volume limitations, a robot cleaner may encounter inaccessible local environments in work, such as a space with a diameter smaller than the diameter of the robot cleaner, a space with a height lower than the height of the robot cleaner, etc., resulting in uncleaned environments.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter, nor is it intended to be used as an aid in determining the scope of the claimed subject matter.

The technical problem to be solved by the present disclosure is to provide a mother-child robot cooperative work system and a work method thereof that overcomes some defects of other applications. The cooperative work system includes a mother robot and at least one child robot. The mother robot is configured to effectively position the child robot and control the child robot to participate in current work or not. The work of the mother robot and the child robot is reasonably distributed to overcome the height barrier of a work environment. The system has simplified structure and high work efficiency.

The technical problem to be solved by the present disclosure may be achieved by the following example aspects of the technical solution:

A mother-child robot cooperative work system may include a mother robot and a charging base. The mother robot may be provided with a control unit and a work unit, wherein the system may also include a child robot; and the mother robot and the child robot may be configured in wireless communication connection. The mother robot may perform cleaning for a work area under the control of the control unit, and may recognize a cleanable area and an assisted cleaning area during a cleaning process. After cleaning work in the cleanable area is completed, the control unit in the mother robot may control the child robot to cooperatively complete the cleaning work in the assisted cleaning area. The mother robot may be provided with a child robot pose sensing unit for obtaining the positions and the orientation of the child robot; the child robot pose sensing unit may input child robot pose information to the control unit; and the control unit may control the child robot to act as indicated.

For example, the child robot pose sensing unit may include a signal transmitting apparatus and a signal receiving apparatus disposed on the child robot and the mother robot correspondingly; and the mother robot may determine the positions and the orientations of the child robot according to the received signal; and/or the child robot pose sensing unit may include a laser distance sensor disposed on the mother robot.

To effectively recognize the cleanable area and the assisted cleaning area, the mother robot may be provided with a first infrared sensor, a striking plate and/or the laser distance sensor may be connected with the control unit. In these or other embodiments, the sensing height of the first infrared sensor may be greater than or equal to the height of the body of the child robot. Generally, the sensing height of the first infrared sensor may be higher than the height of the body of the child robot by 1 cm or some other suitable height differentiation. According to the actual work area, at least two child robots may be provided.

The present disclosure also provides a work method of the mother-child robot cooperative work system; the work system includes a mother robot and a child robot; and the work method includes one or more steps. For example, step 100 may include performing, by the mother robot, cleaning work in the work area, and recognizing a cleanable area and an assisted cleaning area during a cleaning process, while the child robot being in a standby state; and step 200: after the mother robot completes the cleaning work in the cleanable area, guiding the child robot to cooperatively complete the cleaning work in the assisted cleaning area.

For example, the recognizing for the assisted cleaning sector in the step 100 may include: recognizing, by the mother robot, whether an obstacle exists in the work area in the process of the cleaning work, and further judging a space between a bottom surface of the existing obstacle and a surface of the work area; and recognizing, by the mother robot, an area in which the space between the bottom surface of the obstacle and the surface of the work area is greater than or equal to the height of the body of the child robot in the area having the obstacle as the assisted cleaning area.

Further, the step 200 may include, for example: step 201: fitting the assisted cleaning area to obtain a map of a child robot work area after the mother robot completes the cleaning; step 202: acquiring child robot pose information by the mother robot; and step 203: controlling, by the mother robot according to the child robot pose information, the child robot to move to an assigned place to cooperatively work according to the map of the child robot work area.

Further, the step 202 may include: obtaining the position information of the child robot at first, and then obtaining the orientation information of the child robot. The position information may be the coordinate information of the child robot. The obtaining the orientation information of the child robot may include the following steps: step 2021: detecting the previous position of the child robot to obtain the previous coordinate information (x1, y1); step 2022: controlling the child robot to advance for any distance to reach a current position to obtain current coordinate information (x2, y2); and step 2023: comparing the previous coordinate information with the current coordinate information to determine the motion orientation of the child robot.

In addition, the step 203 may include: generating an assisted cleaning motion path by the mother robot in the map of the child robot work area according to the pose of the child robot; and the child robot moving to an assigned place to conduct cleaning work according to the assisted cleaning motion path.

Additionally or alternatively, the step 203 may include: the mother robot moving according to the pose of the child robot to seek the child robot; and after the mother robot guides the child robot to move to the vicinity of the assigned place, the child robot entering the assigned place to conduct the cleaning work.

In these or other embodiments, the mother-child robot cooperative work system may include a charging base; and the work method may include step 204: returning the child robot to the charging base under the guidance of the mother robot after the child robot completes the cleaning work in the map of the child robot work area; and/or returning the child robot to the charging base automatically after the child robot completes the cleaning work in the map of the child robot work area.

Thus, in some embodiments, the present disclosure may include a mother-child robot cooperative work system and a work method thereof. The mother robot may be configured to effectively position the child robot and control the child robot to participate in current work or not. The work of the mother robot and the child robot may be reasonably distributed to overcome the height barrier of the work environment. The system has simplified structure and high work efficiency. The system has simplified structure and high work efficiency.

The technical solution of the present disclosure is described in detail below in combination with drawings and specific example embodiments.

DETAILED DESCRIPTION OF EXAMPLE EMBODIMENTS

To solve the above example problem, a mother-child robot cooperative work system may be an effective solution. The system may be flexible and efficient in work mode, and can complete cleaning work, including corners in the environments.

Figure 1:
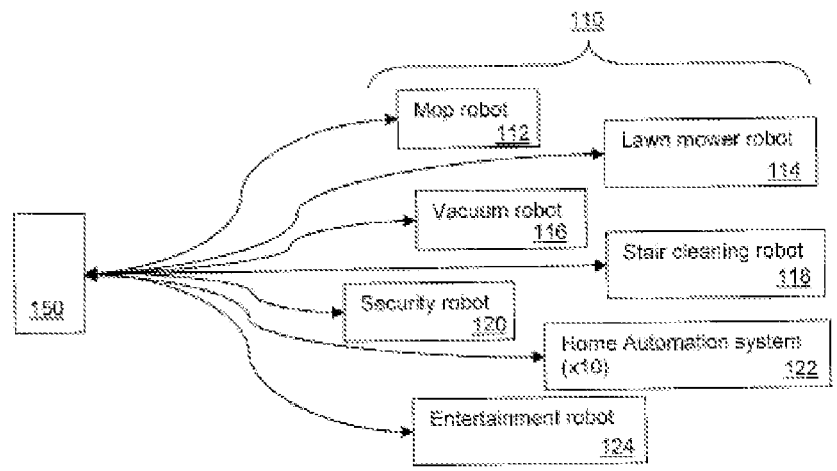
FIG. 1 is a schematic diagram of a system of U.S. Pat. No. 8,755,936 B2.

FIG. 1 is a schematic diagram of a system of U.S. Pat. No. 8,755,936B2. As shown in FIG. 1, a multi-robot cooperative work system is disclosed, including a manager 150 and a plurality of robots 110 in wireless connection with the manager 150. These robots may include a mop robot 112, a lawn mower robot 114, a vacuum robot 116, a stair cleaning robot 118, a security robot 120, a home automation system 122 and an entertainment robot 124. These robots can transmit or receive environmental information and update map information with the manager 150 in a wire communication mode. In this example application, it is substantially only the manager and the robots that realize communication and multiple robots may be integrated in one system, while various robots in the same system have no information interaction and communication with each other.

In addition, Chinese Application Publication Number CN102062587A discloses a multi-mobile robot pose determination method based on a laser sensor. A to-be-determined machine in a to-be-determined region may be scanned by a laser sensor to obtain N discrete data points; by using a rectangle as the scanning feature of the robot, the rectangle feature of the robot may be recognized according to the above data points, and two edges of the rectangle feature of the robot may be extracted; the midpoints of the feature edges of the robot may be respectively calculated according to the situation that one edge or two edges of the rectangle feature of the robot are scanned; and then the central position coordinates of the robot may be calculated. In addition, after above feature line segments are fitted linearly, an inclination angle $\psi$ may be obtained; and the current angle parameter $\psi 1$ of the robot may be calculated according to real-time tracking and comparison of recorded data. The above positioning mode has complex process and large calculation amount.

Moreover, in some applications, because the robot system may only plan the quantity and cleaning tasks of the robots, in different environments (such as low environments), even if an assistance instruction is issued, the cleaning tasks may not be completed smoothly due to the height problem.

Figure 2:
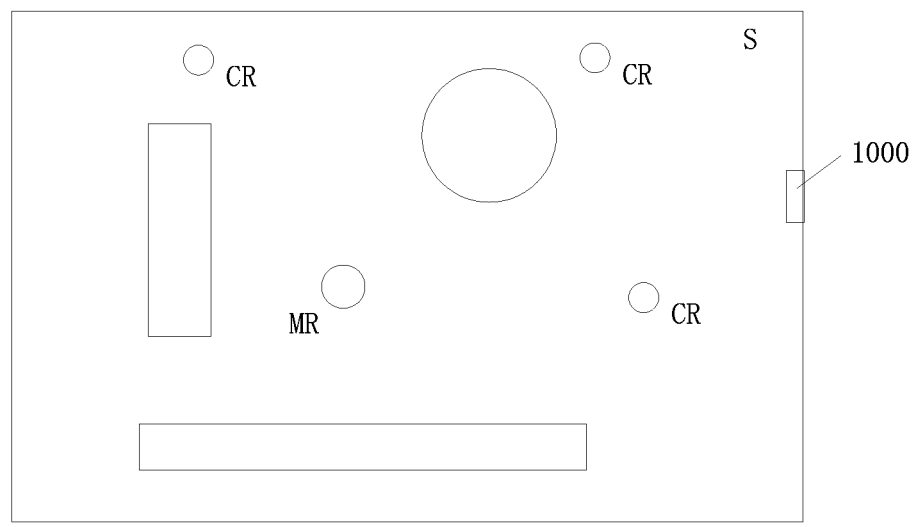
FIG. 2 is a schematic diagram of a position relationship when a mother robot and child robot of the present disclosure are in the same work environment.

FIG. 2 is a schematic diagram of a position relationship when a mother robot and child robot of the present disclosure are in the same work environment. As shown in FIG. 2, the present disclosure provides a mother-child robot cooperative work system which includes a mother robot MR and a charging base 1000. The mother robot MR may be provided with a control unit and a work unit (not shown in the figure). The system also includes a child robot CR; and the mother robot MR and the child robot CR may be configured in wireless communication connection. The mother robot MR performs cleaning for a work area under the control of the control unit, and recognizes cleanable area and an assisted cleaning area during a cleaning process. After cleaning work in the cleanable area is completed, the control unit in the mother robot MR controls the child robot to cooperatively complete the cleaning work in the assisted cleaning area, and/or the control unit controls the child robot to cooperatively complete the cleaning work in the assisted cleaning area, at first, and then the mother robot completes the cleaning work in the cleanable area. The mother robot MR may be provided with a child robot pose sensing unit (not shown in the figure) for obtaining the positions and the orientations of the child robot CR; the child robot pose sensing unit inputs child robot pose information to the control unit; and the control unit controls the child robot to act as indicated.

In some embodiments, the child robot pose sensing unit includes a signal transmitting apparatus and a signal receiving apparatus disposed on the child robot CR and the mother robot MR correspondingly; and the mother robot determines the positions and the orientations of the child robot according to the received signal; or the child robot pose sensing unit includes a laser distance sensor disposed on the mother robot.

To effectively recognize the cleanable area and the assisted cleaning area, the mother robot MR may be provided with a first infrared sensor, a striking plate and/or the laser distance sensor may be connected with the control unit; and the sensing height of the first infrared sensor may be greater than or equal to the height of the body of the child robot CR. Generally, the sensing height of the first infrared sensor may be higher than the height of the body of the child robot by 1 cm.

According to the actual work area, a plurality of child robots CR may be provided.

Figure 3:
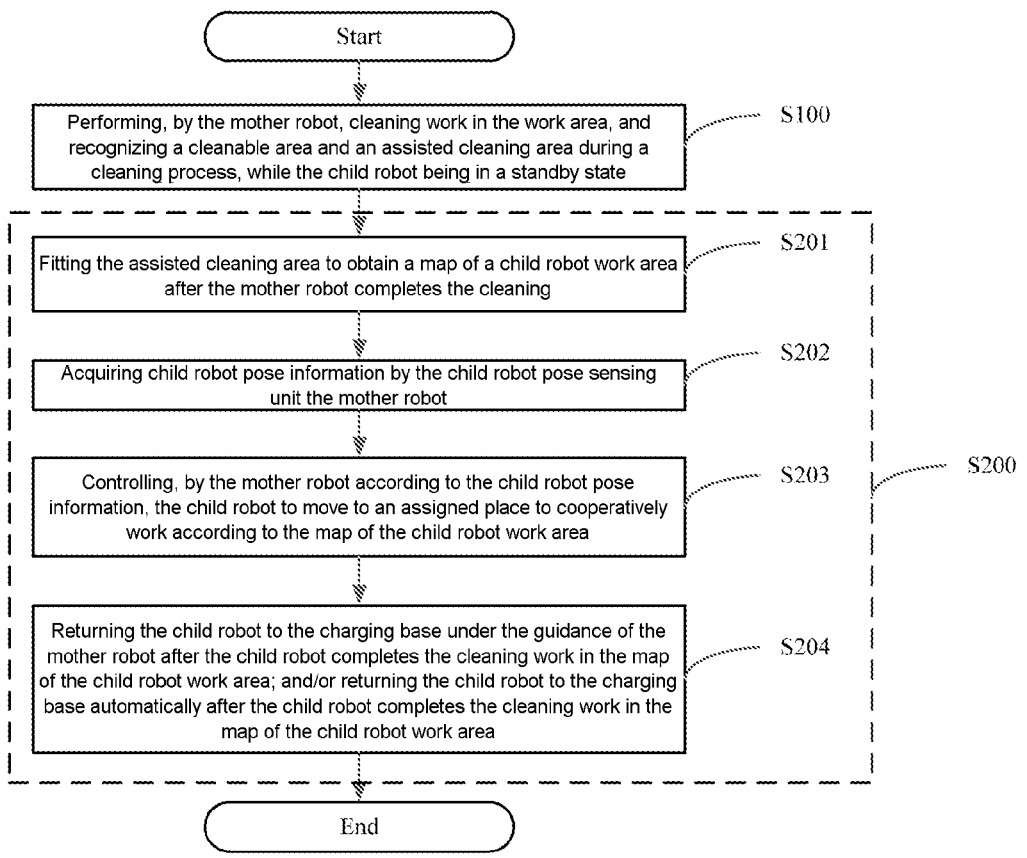
FIG. 3 is a flow chart of a work method of a mother-child robot cooperative work system of the present disclosure.

FIG. 3 is a flow chart of a work method of a mother-child robot cooperative work system of the present disclosure. As shown in FIG. 3, the present disclosure also provides a work method of a mother-child robot cooperative work system. The work system includes a mother robot and a child robot; and the work method may include the following example steps: step 100: performing, by the mother robot, cleaning work in the work area, and recognizing a cleanable area and an assisted cleaning area during a cleaning process, while the child robot being in a standby state; and step 200: after the mother robot completes the cleaning work in the cleanable area, guiding the child robot to cooperatively complete the cleaning work in the assisted cleaning area.

Specifically, the recognizing for the assisted cleaning sector in the step 100 specifically includes: recognizing, by the mother robot, whether an obstacle exists in the work area in the process of the cleaning work, and further judging a space between a bottom surface of the existing obstacle and a surface of the work area; and recognizing, by the mother robot, an area in which the space between the bottom surface of the obstacle and the surface of the work area may be greater than or equal to the height of the body of the child robot in the area having the obstacle as the assisted cleaning area.

Additionally or alternatively, the step 200 may include: step 201: fitting the assisted cleaning area to obtain a map of a child robot work area map after the mother robot completes the cleaning; step 202: acquiring child robot pose information by the mother robot; and step 203: controlling, by the mother robot according to the child robot pose information, the child robot to move to an assigned place to cooperatively work according to the map of the child robot work area.

Additionally or alternatively, the step 202 may include: obtaining the position information of the child robot at first, and then obtaining the orientation information of the child robot. The position information may be the coordinate information of the child robot. The obtaining the orientation information of the child robot may include the following example steps: step 2021: detecting the previous position of the child robot to obtain the previous coordinate information (x1, y1); step 2022: controlling the child robot to advance for any distance to reach a current position to obtain current coordinate information (x2, y2); and/or step 2023: comparing the previous coordinate information with the current coordinate information to determine the motion orientation of the child robot.

Figure 4:
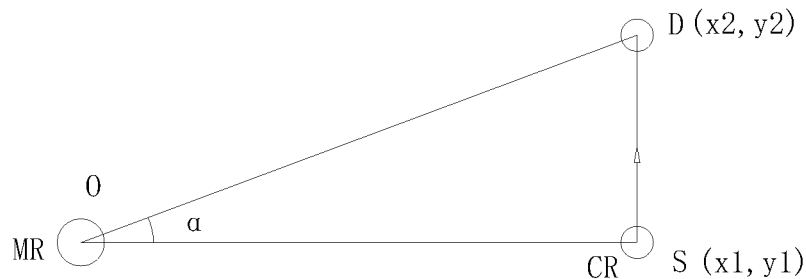
FIG. 4 is a schematic diagram of relative positions of a mother robot and child robot of the present disclosure.

FIG. 4 is a schematic diagram of relative positions of a mother robot and a child robot of the present disclosure. As shown in FIG. 4, the mode in which the mother robot obtains the pose information of the child robot is described below in detail. Specifically, the mother robot MR in the system is at O point; the child robot CR is at S point; the mother robot MR can scan the position of the child robot CR by an own positioning sensor (such as a laser distance sensor, LDS) to obtain the coordinate (x1, y1) of the child robot CR relative to the mother robot MR; and the specific mode of determining the coordinate may be to scan the profile of the mother robot MR to obtain a fitting curve and then calculate a central position of the mother robot MR. At this moment or approximately thereabout, the position of the child robot CR may be known, and the positive direction of the child robot CR (i.e., the orientation of the child robot CR) may not be known. In the present disclosure, the child robot CR advances for a distance from the original S point to D point, and the position information from the mother robot at O point to the child robot at D point (i.e., the coordinate (x2, y2) of the child robot CR relative to the mother robot MR) may be obtained again; the coordinates of the child robot CR at S point and D point may be compared to obtain the values of OS, OD and angle α, so as to judge that the advancing direction of the child robot CR may be an arrow direction shown in FIG. 2.

Besides the above pose (direction) information obtained by the motion mode of the child robot CR, a signal transmitting apparatus can be disposed on the child robot CR. The signal transmitting apparatus can transmit a signal directionally; and the mother robot can receive the transmitted signal by the signal transmitting apparatus or the rotation of the child robot CR. The mother robot MR may seek and receive the signal around the child robot CR; and after the signal is received, the direction of the child robot CR can be determined.

Additionally or alternatively, the step 203 may include: generating an assisted cleaning motion path by the mother robot in the map of the child robot work area according to the pose of the child robot; and the child robot moving to an assigned place to conduct cleaning work according to the assisted cleaning motion path.

Additionally or alternatively, the step 203 may include: the mother robot moving according to the pose of the child robot to seek the child robot; and after the mother robot guides the child robot to move to the vicinity of the assigned place, the child robot entering the assigned place automatically to conduct the cleaning work.

In these or other embodiments, the mother-child robot cooperative work system may include a charging base 1000; and the work method may include a step 204: returning the child robot CR to the charging base 1000 under the guidance of the mother robot MR after the child robot CR completes the cleaning work in the map of the child robot work area; and/or returning the child robot CR to the charging base 1000 automatically after the child robot CR completes the cleaning work in the map of the child robot work area. Additionally or alternatively, the child robot CR completing the cleaning work in the map of the child robot work area may include completing the cleaning work of the whole area in the map of the child robot work area, by the child robot CR. In other words, the step 204 may include, after the whole area in the map of the child robot work area is cleaned up by the child robot CR, returning the child robot CR to the charging base 1000 under the guidance of the mother robot MR, and/or returning the child robot CR to the charging base 1000 automatically.

The technical solution of the present disclosure is described in detail below by specific embodiments.

Embodiment 1

As shown in FIG. 2, in the present embodiment, the mother robot MR may be respectively provided with a laser distance sensor (LDS) and a first infrared sensor. The mother robot performs the cleaning work in the work area at first, obtains a plane map of obstacles in the work area by scanning of the LDS, and further judges spaces between bottom surfaces of the existing obstacles and a surface of the work area by the first infrared sensor. The sector having no obstacle in the work area may be the cleanable sector. In the area having the obstacles, an area in which the spaces between the bottom surfaces of the obstacles and the surface of the work area are greater than or equal to the height of the body of the child robot may be recognized as the assisted cleaning area. The assisted cleaning area may be fitted to obtain a map of a child robot work area after the mother robot completes the cleaning. The mother robot obtains the child robot pose information by the above mode shown in FIG. 4. Subsequently, the mother robot may generate an assisted cleaning motion path in the map of the child robot work area according to the pose of the child robot; and the child robot may move to an assigned place to conduct cleaning work according to the assisted cleaning motion path. After the child robot completes the cleaning work in the map of the child robot work area the child robot returns to the charging base automatically.

Embodiment 2

As shown in FIG. 2, in the present embodiment, the mother robot MR may be respectively provided with a striking plate and a first infrared sensor. The mother robot obtains a plane map of obstacles in the work area by the striking plate at first, and further judges spaces between bottom surfaces of the existing obstacles and a surface of the work area by the first infrared sensor. Similarly, the sector having no obstacle in the work area may be the cleanable sector. In the area having the obstacles, an area in which the spaces between the bottom surfaces of the obstacles and the surface of the work area are greater than or equal to the height of the body of the child robot may be recognized as the assisted cleaning area. The assisted cleaning area may be fitted to obtain a map of a child robot work area after the mother robot completes the cleaning. The mother robot may obtain the child robot pose information by the above mode shown in FIG. 4. Subsequently, the mother robot may move according to the pose of the child robot to seek the child robot; and after the mother robot guides the child robot to move to the vicinity of the assigned place, the child robot may enter the assigned place automatically to conduct the cleaning work. The child robot may return to the charging base under the guidance of the mother robot after the child robot completes the cleaning work in the map of the child robot work area.

Based on the above description, the mother robot MR may be substantially the main completer of the cleaning work. When the mother robot MR encounters an inaccessible environment, the mother robot MR can control the child robot CR with a volume or height smaller than that of the mother robot MR to enter to complete the cleaning. In these or other embodiments, the mother robot MR can control the child robot CR to complete the cleaning for a specific sector. In some embodiments, when the mother robot MR works, the position state of the child robot CR may include: the child robot CR waits for being controlled at the charging base 1000; the child robot CR follows the mother robot MR and moves at the same time; and/or the child robot CR keeps moving within a certain distance around the mother robot MR. Additionally or alternatively, the work state of the child robot CR may include: when the mother robot MR starts to work, the child robot CR may be controlled and started to wait for a command; and/or after the mother robot MR starts to work, when the mother robot MR encounters an environment that needs the child robot CR, the mother robot MR controls the child robot to start and controls the work of the child robot.

In these or other embodiments, the mother-child robot cooperative work system provided by the present disclosure may include the following example aspects: the system may be a multi-robot cooperative work system which includes the mother robot and the child robot; on the basis that the system includes multiple robots, the multiple robots may be the same kind of robots or may be different kinds of robots; and/or the mother robot can obtain relative states or position relationships of the child robot and the mother robot, so as to control or guide the child robot to conduct the cleaning work in the assigned position.

Thus, in some embodiments, the present disclosure may include a mother-child robot cooperative work system and a work method thereof. The mother robot may be configured to effectively position the child robot and control the child robot to participate in current work or not. The work of the mother robot and the child robot may be reasonably distributed to overcome the height barrier of the work environment. The system has simplified structure and high work efficiency.

Correspondingly, an embodiment of the present disclosure may also include a computer-readable storage medium that stores a computer program. The computer program, when executed by a computer, can implement the blocks (e.g., elements, steps, functions, etc.) with respect to the self-propelled robot path planning method of the present disclosure.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A mother-child robot cooperative work system, comprising:
   a mother robot and a charging base, the mother robot being provided with a control unit and a work unit; and
   a child robot communicatively coupled to the mother robot, wherein;
   the mother robot performs cleaning for a work area under the control of the control unit,
   the mother robot recognizes a cleanable area and an assisted cleaning area during a cleaning process;
   the control unit in the mother robot controls the child robot to cooperatively complete the cleaning work in the assisted cleaning area; and
   the mother robot is provided with a child robot pose sensing unit that obtains a position and a motion orientation of the child robot; the child robot pose sensing unit configured to input the position and the motion orientation of the child robot to the control unit; and the control unit controls the child robot according to the position and the motion orientation of the child robot.

2. The mother-child robot cooperative work system of claim 1, wherein:
   the child robot pose sensing unit comprises a signal transmitting apparatus and a signal receiving apparatus disposed on the child robot and the mother robot correspondingly, the mother robot configured to determine the position and the motion orientation of the child robot according to received signals; or
   the child robot pose sensing unit comprises a laser distance sensor disposed on the mother robot.

3. The mother-child robot cooperative work system of claim 1, wherein:
   the mother robot is provided with at least one of a first infrared sensor, a striking plate and the laser distance sensor connected with the control unit; and
   the sensing height of the first infrared sensor is greater than or equal to the height of the body of the child robot.

4. The mother-child robot cooperative work system of claim 3, wherein the sensing height of the first infrared sensor is higher than the height of the body of the child robot by 1 cm.

5. The mother-child robot cooperative work system of claim 4, wherein a plurality of child robots are provided.

6. The mother-child robot cooperative work system of claim 1, wherein:
   the control unit of the mother robot controls the child robot according to the position and the motion orientation of the child robot.

7. A work method of a mother-child robot cooperative work system, the work method comprising:
   a mother robot and child robot, wherein the work method comprises:
   performing, by the mother robot, cleaning work in the work area, and recognizing a cleanable area and an assisted cleaning area during a cleaning process, while the child robot being in a standby state; and
   guiding the child robot to cooperatively complete the cleaning work in the assisted cleaning area according to a position and a motion orientation of the child robot;
   wherein guiding the child robot to cooperatively complete the cleaning work in the assisted cleaning area according to a position and a motion orientation of the child robot, comprises:
   acquiring, by the mother robot, a position and a motion orientation of the child robot and
   controlling, by the mother robot, according to the position and the motion orientation of the child robot, to complete the cleaning work in the assisted cleaning area.

8. The work method of claim 7, wherein the recognizing for the assisted cleaning area comprises:
   recognizing, by the mother robot, whether an obstacle exists in the work area during the cleaning process, and further judging a space between a bottom surface of the existing obstacle and a surface of the work area; and
   recognizing, by the mother robot, an area in which the space between the bottom surface of the obstacle and the surface of the work area is greater than or equal to the height of the body of the child robot in the area having the obstacle as the assisted cleaning area.

9. The work method of claim 7, wherein guiding the child robot to cooperatively complete the cleaning work in the assisted cleaning area further comprises:
   fitting the assisted cleaning area to obtain a child robot work area after the mother robot completes the cleaning;
   and
   controlling, by the mother robot according to the position and the motion orientation of the child robot, the child robot to move to an assigned place to cooperatively work according to a map of the child robot work area.

10. The work method of claim 9, wherein the acquiring the position and the motion orientation of the child robot, by the mother robot further comprises first obtaining the position information of the child robot, and then obtaining the motion orientation information of the child robot.

11. The work method of claim 10, wherein:
the position information is the coordinate information of the child robot; and
the obtaining the motion orientation information of the child robot comprises:
detecting the previous position of the child robot to obtain the previous coordinate information (x1, y1);
controlling the child robot to advance for any distance to reach a current position to obtain current coordinate information (x2, y2); and
comparing the previous coordinate information with the current coordinate information to determine the motion orientation information of the child robot.

12. The work method of claim 11, wherein controlling, by the mother robot according to the child robot pose information, the child robot to move to an assigned place to cooperatively work according to the map of the child robot work area further comprises:
generating an assisted cleaning motion path by the mother robot in the child robot work sector map according to the pose of the child robot; and
the child robot moving to an assigned place to conduct cleaning work according to the assisted cleaning motion path.

13. The work method of claim 11, wherein controlling, by the mother robot according to the child robot pose information, the child robot to move to an assigned place to cooperatively work according to the map of the child robot work area further comprises:
the mother robot moving according to the pose of the child robot to seek the child robot; and
after the mother robot guides the child robot to move to the vicinity of the assigned place, the child robot entering the assigned place to conduct the cleaning work.

14. The work method of claim 10, wherein:
the mother robot-child robot cooperative work system further comprises a charging base; and
the work method further comprises: returning the child robot to the charging base under the guidance of the mother robot after the child robot completes the cleaning work in the map of the child robot work area; or returning the child robot to the charging base automatically after the child robot completes the cleaning work in the map of the child robot work area.

15. A mother-child robot cooperative work system, comprising:
a mother robot is provided with a control unit and a work unit;
a child robot communicatively coupled to the mother robot, wherein:
the mother robot performs cleaning for a work area under the control of the control unit,
and the mother robot recognizes a cleanable area and an assisted cleaning sectors in the work area during a cleaning process;
the mother robot completes the cleaning work in the cleanable area and controls the child robot to cooperatively complete the cleaning work in the assisted cleaning area; and
the mother robot is provided with a child robot pose sensing unit that obtains pose information of the child robot, the child robot pose sensing unit configured to input the pose information of the child robot to the control unit; and the control unit configured to control the child robot, wherein the pose information comprises a position and a motion orientation.

16. The mother-child robot cooperative work system of claim 15, wherein:
the control unit of the mother robot controls the child robot according to the position and the motion orientation of the child robot.

17. A work method of a mother-child robot cooperative work system including a mother robot and a child robot, the work system comprising:
recognizing a cleanable area and assisted cleaning area by the mother robot; and
completing, by the mother robot, the cleaning work in the cleanable area, and guiding the child robot to cooperatively complete the cleaning work in the assisted cleaning area according to a position and a motion orientation of the child robot;
wherein guiding the child robot to cooperatively complete the cleaning work in the assisted cleaning area according to a position and a motion orientation of the child robot, comprises:
acquiring, by the mother robot, a position and a motion orientation of the child robot; and
controlling, by the mother robot, according to the position and the motion orientation of the child robot, to complete the cleaning work in the assisted cleaning area.

* * * * *